Sept. 30, 1952     T. C. WOOD     2,612,333

RELEASABLE CANOPY

Filed Feb. 8, 1949

Thurman C. Wood
*INVENTOR.*

BY *James M. Clark*

Patented Sept. 30, 1952

2,612,333

UNITED STATES PATENT OFFICE 2,612,333

RELEASABLE CANOPY

Thurman C. Wood, Inglewood, Calif., assignor to North American Aviation, Inc.

Application February 8, 1949, Serial No. 75,214

12 Claims. (Cl. 244—121)

The present invention relates generally to aircraft and like vehicles and more particularly to improved releasing mechanism for canopies, enclosures and similar components.

The present invention is directed primarily to an improved arrangement which provides means for effectively retaining an aircraft canopy upon a cockpit compartment, including provision for sealing the same to permit internal pressurization of the aircraft compartment, the retaining means being so arranged as to permit instantaneous release of the canopy or enclosure for emergency jettisoning of the same to permit an occupant to leave the aircraft with a minimum of delay. Numerous forms of releasing mechanisms have been designed and used for jettisonable canopies for aircraft and similar vehicles, and many have proven unsatisfactory due to unduly complicated and heavy releasing mechanism. Other of such devices were susceptible of jamming in an emergency and for other reasons made their installation upon the aircraft unsatisfactory from the standpoint of the occupant not being assured of his ability of his making a hasty exit from the aircraft under emergency conditions, both in flight and upon the ground.

The presently improved construction relates essentially to a slotted retainer strip or rail of curved cross-sectional shape having an extending nose portion which engages and retains the lower edge of the canopy. The improvement also includes means for rapidly and positively translating the retainer rail in such manner that fixed pins projecting through its curved cam slots impart a rocking or rolling movement to the rail simultaneously as it is translated; thereby causing its nose portion to be withdrawn from the lower edge of the canopy for the rapid release of the same.

It is, accordingly, a major object of the present invention to provide an improved arrangement of a jettisonable aircraft canopy or like component for release from an aircraft or other vehicle. It is a further object to provide an improved releasing mechanism which is particularly adapted for the release of canopies from internally pressurized aircraft. A still further object resides in the provision of a simplified positive-acting releasing mechanism which simultaneously releases both lateral edges of a canopy for its instantaneous release. Other objects and advantages of the present invention will occur to those skilled in the art after reading the present description, taken together with the accompanying drawings forming a part hereof in which:

Figure 1:
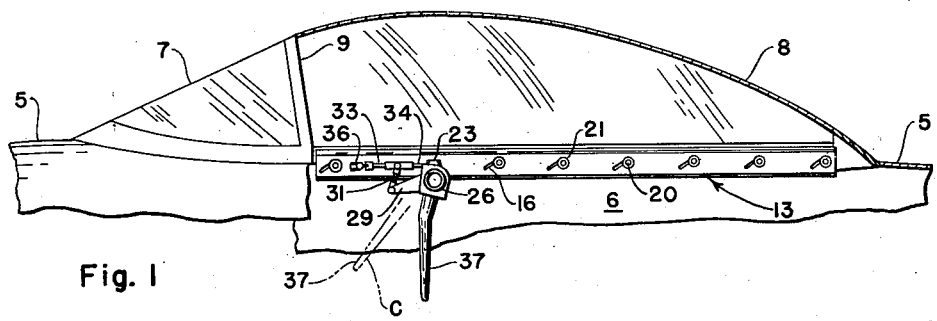
Fig. 1 is an elevational view, partly in section, of an aircraft cockpit having a canopy to which a form of the present releasing mechanism has been applied.

Referring now to Fig. 1, the numeral 5 indicates the upper portion of the fuselage skin covering of an aircraft or similar vehicle having a cockpit or compartment defined by the interior side walls 6. A fixed windshield portion 7 is provided above the forward portion of the cockpit and its aft portion is covered by a streamlined removable canopy portion 8, the windshield 7 and canopy 8 preferably being transparent to permit visibility therethrough and meeting each other along a transverse parting line indicated at 9. All of the other edges of the canopy 8, as well as the aft portion and that which abuts the fixed windshield portion along the parting line 9, are preferably provided with sealing strips to facilitate internal pressurization of the aircraft cockpit. As is more clearly shown in the section in Fig. 3, the internal wall 6 of the cockpit preferably is attached to a sill or a coaming portion 10 which extends horizontally beneath the lower lateral edges of the canopy 8, the coaming 10 extending outwardly under the fuselage skin 5 to which it may also be attached. In the form of the invention shown in Fig. 3, the lower lateral edges of the canopy 8 are preferably provided with a reduced thickness portion 19 terminating in the transverse shoulder 18 with a strip 11 of nylon or other flexible composition material capable of being made airtight, cemented to the reduced portion 19 and having an extending loop portion encircling a cylindrical rod or wire 12, forming a detent for the canopy retaining edge.

Figure 3:
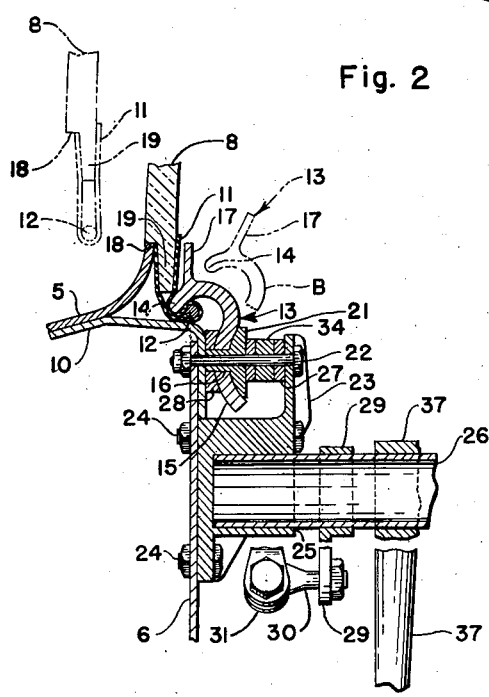
Fig. 3 is a sectional elevational view taken along the lines 3—3 of Fig. 2.

Referring again to Fig. 1, a retainer or keeper rail 13 is provided along each side of the cockpit being substantially parallel to and contiguous with the lower lateral edges of the canopy 8. As shown in detail in Fig. 3, the retainer 13 is of a curved cross-section being generally hook shaped with its tongue end or rounded nose 14 extending downwardly and outwardly in the engaged condition of the canopy 8 such that the nose portion 14 engages the loop 11 between the lower edge of the reduced canopy portion 19 and the detent rod 12. The lower portion 15 of the retainer 13 is arcuate or curvilinear in cross-section, having its lower portion 15 curved inwardly away from the coaming 6 and being provided above its hooked portion with an upstanding flange or fin 17 which in the engaged position of the retainer is contiguous and parallel to the lower edge of the canopy 8, as shown in Fig. 3.

The retainer strip 13, of which there is an opposite counter-part on the other lateral side of the cockpit, is provided with a plurality of angularly divergent camming slots 16 extending through the wall of the retainer element at its lower curved portion. All of the slots 16 within the same retainer 13 are alike and are formed from a lower angularly inclined camming portion which slopes upwardly and rearwardly from its forward end and has a straight or horizontally extending rearward portion. The arrangement of the angularly divergent slots 16 within the curved portion of the retainer rail 13 is such that as the rail is translated rearwardly from the position shown in Figs. 1 and 2 the fixed pins 20 and 22, disposed within the slots, impart an upward and inward rocking movement to the upper portion of the retainer strip. Referring now to Fig. 3, as the canopy 8 is lowered upon the coaming of the fuselage cockpit into its attached position, the shoulder 18 will bear against the upturned portion of the fuselage skin 5. As the flexible loop 11 enclosing the rod 12 is suspended beneath the reduced portion 19 of the canopy, the rod 12 in resting upon the coaming or sill 10 is engaged by the nose portion 14 of the retainer strip as the latter is moved into its extreme forward position. In this retained condition as shown in the full lines in Fig. 3, the nose portion 14 bears against the two thicknesses of the loop 11 between the detent rod 12 and the lower edge of the reduced canopy portion 19, thereby firmly retaining the canopy 8 in its attached position in which internal pressurization of the cockpit can be maintained without undue pressure loss between the lower edge of the canopy and the adjacent fuselage structure, and the canopy is also firmly held against this internal pressure which tends to lift the same off the coaming of the fuselage cockpit. It will be understood that the cockpit shown and described herein may be pressurized or supercharged by the usual means and equipment for increasing or maintaining higher pressures within the cockpit for the breathing comfort of the pilot when the aircraft is flown at higher altitudes at which the pressures are appreciably lower than the normal atmospheric pressures at sea level or moderate altitudes.

As indicated above, the retainer strip 13 is mounted through each of its plurality of angularly divergent camming slots 16 by means of the guide pins 20 provided with stud washers 21, and by a like pin 22 mounted through the bracket fitting 23. The latter is attached to the fuselage wall 6 by the bolts 24 and is provided with a bearing portion 25 within which is journalled the transverse torque tube 26 which extends across the fuselage width to the opposite wall at which it is journalled within a like, but opposite hand, fitting (not shown). The main pin 22 passes through the upper terminal of the fitting 23 and in addition to engaging a slot 16 in the retainer rail 13 also passes through a stud washer 21 having a convex face engaging the inner face of the retainer rail 13 and the washer 28 having a concave face engaging the outer convex surface of the rail 13. The pin 22, passing through the offset portion of the bracket 23, also forms a pivot about which part of the actuating mechanism to be described is also operated.

The transverse torque tube 26 has fixedly mounted thereon a lever element 29 having a pivotal connection 30 at its forwardly extending terminal by which it is connected to the lower slotted terminal of the push-pull rod 31. The upper terminal of the rod 31 is connected by the pivot 32 to the intermediate terminals of a breaking or toggle linkage 33 and 34, the link 33 extending forwardly and being pivotally connected through the universal pin fitting 35 to an anchoring fitting 36 suitably fastened to the retainer rail 13. The rearwardly extending break link 34 is pivotally mounted upon the aforementioned extended pin 22, between the spacing washers 27. The torque tube 26 also has secured to it an operating lever 37 which extends substantially downwardly in a vertical position in the attached condition of the canopy as shown in Figs. 1 and 2.

Figure 2:
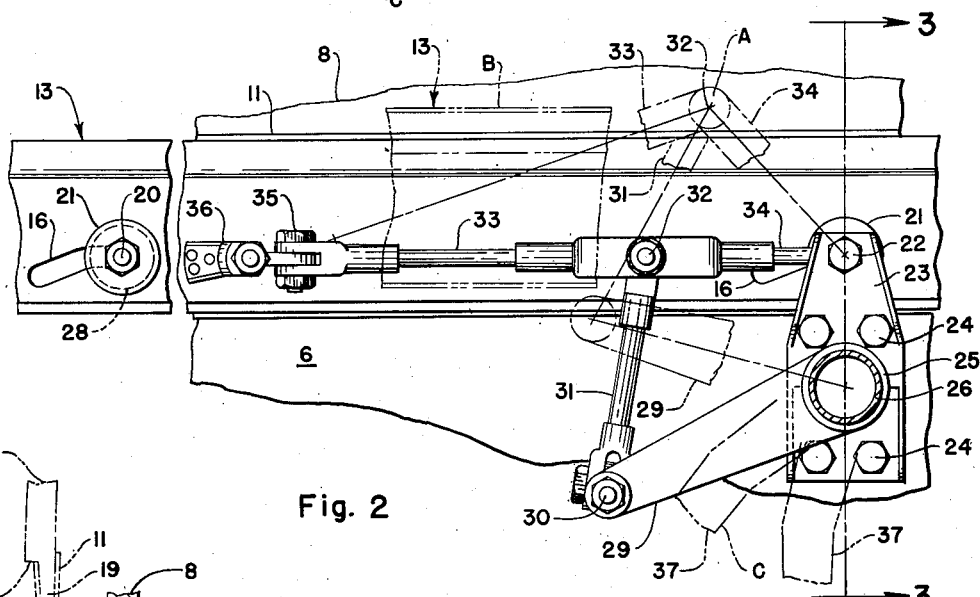
Fig. 2 is an enlarged elevational view of a portion of the releasing mechanism shown in Fig. 1.

Forward movement or clockwise rotation of the manual lever 37 from its full line position in Fig. 1 to the broken line positions of Figs. 1 and 2 imparts like rotation to the lever 29 and upward movement of the rod 31, causing the linkage 33—34 to be broken as its intermediate pivot 32 is caused to move upwardly to the broken line position A. As the pivot 32 is caused to move upwardly and rearwardly it is caused to follow an arcuate path about the fixed pin 22 as a center, and to draw the rail 13 forwardly through the anchor fitting 36. The universal pin fitting 35 permits counterclockwise rotation of the breaking link 33 about the anchor pivot fitting 36 causing the rail to be moved rearwardly. As the inclined camming portions of the slots 16 are moved rearwardly along the fixed guide pins 20 and 22, the retainer 13 is caused to move upwardly and to rock such that its upper portion is rotated inwardly toward the cockpit, and its lower portion rotated outwardly, until the retainer 13 reaches its fully released position, as indicated by the broken lines B in Figs. 2 and 3. Before the extreme position B is reached, the internal pressure within the cockpit acting as a lifting force upon the undersurface of the canopy will cause the same to be lifted vertically off the coaming 10 and the seat formed by the upturned fuselage skin 5, from which position it is lifted freely away from the airplane by the effect of the airstream getting under its forward edge. The canopy position shown in a laterally displaced released position in the broken lines in Fig. 3 is one into which it might be moved by lateral forces although normally it would be lifted more vertically from its attached position.

Inasmuch as the torque tube 26 extends across the cockpit and has attached to its opposite end similar operating mechanism from the lever 29 through to the break links 33 and 34 and their fixed and movable terminals, the retainer strip on the opposite side of the cockpit is moved aft simultaneously with that shown in the drawings, with the result that both lower lateral edges of the canopy 8 are simultaneously released, and that the canopy is lifted substantially vertically as it is released. The canopy 8 is attached by a reversal of the above described operation, i. e., by lowering the canopy into position as the retainer rails are in their rearward released position, and after locating the rod 12 in the position shown the lever 37 can be drawn rearwardly in the counterclockwise direction. As the lever 29 is thus rotated from its position A in Fig. 2, the link 31 draws the intermediate pivot 32 downwardly and forwardly rocking the break link 34 about the fixed pivot 22 and due to the toggle effect created by the straightening of the break links 33 and 34, the terminal pivotal connection 35—36 is pushed forwardly carrying the retainer strip forwardly at the same time. The camming slots 16 ride along the pins 20 and 22 thereby causing the strip 13 to be moved downwardly from its position B in Fig. 2 to the full line position in which the nose portion 14 moves downwardly and outwardly firmly retaining the loop enclosed detent rod 12 against the coaming 10. The canopy is then attached in a pressure-tight manner against the fuselage and fixed windshield 7 through the sealing means along the parting line 9 and is again ready for internal pressurization and flight at elevated altitudes. It will be noted that the limits of the fore and aft movement of the retainer strips 13 are defined by the ends of the camming slots 16 and the retainers 13 may either by straight, as viewed in plan, or they may be curved to follow the similarly curved edge of the canopy.

Figure 4:
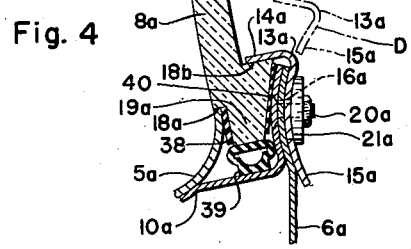
Fig. 4 is a similar cross-sectional view of a modified form of the canopy retaining edge and a portion of the releasing mechanism.

In Fig. 4 there is shown a modified form of canopy edge and retaining strip in which the fuselage skin is indicated at 5a, the cockpit wall as 6a and the canopy as 8a. The retainer strip 13a is arcuately formed, as from sheet material, being provided with an outwardly directed retaining nose portion 14a and a curved lower portion 15a. The latter curved portion is provided with similar camming slots 16a engaged by the fixed guide pins 20a and the washers 21a. The lower marginal edges of the canopy 8a are provided with an enlarged portion 19a having an inwardly offset shoulder 18a on its outer face engaged by the upturned edge of the fuselage skin 5a bearing against a composition sealing strip 38. The enlarged portion 19a is also defined by an inwardly offset shoulder 18b adapted to be engaged by the nose portion 14a of the retaining strip 13a. Between the coaming or sill portion 10a of the fuselage covering and the lower edge 19a of the canopy, there is disposed a hollow tubular sealing member 39, and between the upwardly curved portion of the sheet 10a and the canopy, there is disposed a further sealing strip 40. The retaining strip 13a of the modification shown in Fig. 4 is arranged to be operated by similar mechanism to that shown in Figs. 1, 2 and 3, such that the released position of the retaining strip is indicated at D in this figure, after the retaining strip has been moved into its extreme aft position. The lower edge of the canopy 8a is adequately sealed against loss of internal pressure by the sealing elements 38, 39 and 40 and in this modification, as well as in that previously described, the external surface of the canopy is perfectly faired smooth and flush with the adjacent fuselage skin 5a.

The disclosed canopy retaining and operating mechanism has proven very satisfactory in actual tests and due to its relative simplicity and positive actuation it has been relatively inexpensive to construct as compared to prior constructions, as well as being fool-proof in its ability to be positively jettisoned under severe and hazardous service conditions. In certain installations, its operation has been facilitated by several minor mechanical additions such as the provision of rollers in the cam slots 16 and the segmenting of the slotted release members 13.

Other forms and modifications of the present invention, both with respect to its general arrangement and the details of its respective parts, which may occur to those skilled in the art after reading the present description, are all intended to come within the scope and spirit of this invention, as more particularly defined in the appended claims.

I claim:

1. In a releasable canopy for aircraft, an aircraft structure, a canopy having a longitudinally extending edge arranged to be attached to said aircraft structure, said canopy edge having a flexible fabric loop enclosing a longitudinally extending element forming a canopy edge detent means, and a slidably mounted member arranged to be moved from a first position in which it clamps said fabric loop between said canopy edge and said longitudinally extending element against said aircraft structure to an opposite position in which it is disengaged from said fabric loop for the release of said canopy from said aircraft structure.

2. The combination with an aircraft canopy of retaining and releasing means therefor, comprising a detent carried by an edge of said canopy, a retaining member extending substantially parallel to said canopy edge and having a tongue portion in retaining engagement with the detent thereof, said retaining member having a portion of arcuate curved cross-section, similarly arcuate bearing means carried by the aircraft structure for slidably supporting said retaining member for both longitudinal and lateral sliding movements, camming means associated with said arcuate bearing means, and means for imparting longitudinal movements to said retaining member whereby said camming means causes lateral movement across said arcuately curved portion for releasing movement of said retaining member from the detent carried by said canopy edge.

3. In aircraft, an aircraft body having a sill structure, a releasable component having an edge arranged to bear against said sill structure, said component having detent means carried thereby, means for releasably retaining the detent means of said component including a member of curved cross-section, an edge of said retaining member arranged to engage the detent means of said component for fixedly retaining the same against said sill structure, means for slidably mounting said retaining member upon the aircraft structure, camming means associated with the said mounting means and means for imparting simultaneous rectilinear and lateral rocking movement as determined by the curved cross-section of said retaining member with respect to said sill structure whereby said retaining member is disengaged from said detent means for the release of said component.

4. In aircraft, a canopy having a longitudinally extending retaining edge, a sill structure on the aircraft against which said canopy edge is arranged to be supported, a longitudinally extending detent associated with said canopy edge, transversely extending guide means carried by the aircraft structure, longitudinally extending retaining means having camming slots in engagement with said guide means, said guide means defining in cooperation with said camming slots the longitudinal limits of movement of said retaining means, said retaining means being of curvilinear cross-section having a tongue portion arranged to clampingly retain said canopy detent means against said sill structure, and means for longitudinally moving said retaining means in such manner that said guide means in engagement with said camming slots impart lateral disengagement movement to said retaining means and said curvilinear cross-sectional shape imparts simultaneous rocking movement to said retaining means.

5. In releasable aircraft canopy construction, a canopy having a detent associated with an edge thereof, a sill structure carried by the aircraft against which said canopy edge is arranged to bear, a retaining means of curved cross-section slidably supported upon the aircraft structure, said retaining means provided with angularly disposed camming slots, guide means carried by the aircraft structure arranged to engage said camming slots and to impart rocking movement to said retaining means as determined by said curved cross-section as it is translated longitudinally along said canopy edge, and means for translating said retaining means from a first position in which it retains said canopy edge to an opposite position in which it is removed from the detent associated with said canopy edge.

6. In aircraft, a canopy having a longitudinally extending detent portion, a sill carried by the aircraft structure against which said canopy detent portion is arranged to bear, a longitudinally extending retainer member of curvilinear cross-section slidably mounted upon the aircraft structure between two longitudinally displaced positions defined by angularly divergent slots extending through said retainer member, guide means fixedly supported from the aircraft structure engaging said retainer member slots, and toggle mechanism arranged for movements of said retainer member from a first of said limiting positions in which it retains said detent portion of said canopy edge against said sill structure to its opposite position in which said curved member is rocked away from said detent portion as determined by said curvilinear cross-section for the release of said detent portion and canopy edge from said aircraft structure.

7. The combination with an aircraft having a cockpit and a canopy normally retained above said cockpit in a pressure-tight relationship with the aircraft, of retaining means having a transversely curved portion capable of longitudinal translatory movement and lateral rocking movement, supporting means carried by the aircraft arranged to impart said lateral rocking movement in cooperation with said transversely curved portion while said retaining means is translated longitudinally, and actuating means for imparting longitudinal movement to said retaining means between its extreme positions in one of which it securely clamps said canopy to the aircraft and in the other of which said canopy is detached from the aircraft.

8. The combination with an aircraft having a pressurized cockpit and a canopy normally retained above said cockpit in a pressure-tight relationship with the aircraft, of retaining means having a transversely curved portion capable of simultaneous longitudinal translatory movement and lateral rocking movement, supporting means carried by the aircraft arranged to impart said lateral rocking movement in cooperation with said transversely curved portion while said retaining means is translated longitudinally, sealing means associated with the joint between said canopy and said cockpit, and operating means for imparting simultaneous longitudinal and rocking movement to said retaining means between its extreme positions in one of which it securely clamps said canopy to the aircraft in a pressure-tight manner and in the other of which said canopy is detached from the aircraft.

9. In a releasable canopy for aircraft, an aircraft structure, a canopy having a longitudinally extending edge arranged to be attached to said aircraft structure, said canopy having a loop of flexible material enclosing a longitudinally extending element forming a canopy edge detent means, and a slidably mounted member arranged to be moved from a first position in which it clamps said flexible loop in a pressure-tight relationship against said aircraft structure to an opposite position in which it is disengaged from said flexible loop for the release of said canopy from said aircraft structure.

10. In a retaining and releasing structure for an aircraft canopy, a detent carried by an edge of said canopy, a retaining member movably carried upon the aircraft, said retaining member having a tongue portion arranged for retaining engagement with said canopy detent, said retaining member having a curved portion, similarly curved bearing means carried by the aircraft structure for slidably supporting said retaining member for both longitudinal and lateral sliding movements, guide means associated with said arcuate bearing means, and means for imparting longitudinal movements to said retaining member whereby said guide means imparts lateral movements to said retaining member across said curved portion for releasing movement of said retaining member from said detent carried by said canopy edge.

11. In aircraft, a longitudinally extending sill structure, a releasable aircraft component arranged for rapid attachment to and detachment from said sill structure, said sill structure including a portion having a transversely curved bearing surface, releasing means including a portion having a complementary transversely curved bearing surface, means clampingly associated with said sill structure and said releasing means for maintaining said curved bearing surfaces in sliding contact, and further means engageable by said first means for imparting transverse attaching and detaching movements to said releasing means as determined by the curvature of said bearing surfaces and as initiated by longitudinal movement of said releasing means with respect to said sill structure.

12. In aircraft, a longitudinally extending supporting structure, a releasable component arranged for rapid attachment to and detachment from said supporting structure, said supporting structure including a portion having a transversely curved bearing surface, releasing means including a portion having a complementary transversely curved bearing surface, means including a headed pin associated with said supporting structure and said releasing means for maintaining said complementary bearing surfaces in sliding contact, and further means including angularly disposed slots operatively engaged by said pin means for imparting combined transverse and longitudinal movements to said releasing means as determined by the curvature of said bearing surfaces initiated by longitudinal movement of said releasable means with respect to said supporting structure.

THURMAN C. WOOD.

REFERENCES CITED

The following references are of record in the file of this patent:

UNITED STATES PATENTS

| Number | Name | Date |
| --- | --- | --- |
| 2,361,113 | Lobelle | Oct. 24, 1944 |
| 2,444,114 | Pevney | June 29, 1948 |

FOREIGN PATENTS

| Number | Country | Date |
| --- | --- | --- |
| 703,553 | Germany | Mar. 11, 1941 |